US010529477B2

(12) United States Patent
Takahashi et al.

(10) Patent No.: US 10,529,477 B2
(45) Date of Patent: Jan. 7, 2020

(54) MAGNETIZING DEVICE FOR MAGNETIC ENCODER

(71) Applicant: NTN CORPORATION, Osaka (JP)

(72) Inventors: Toru Takahashi, Iwata (JP); Shintarou Ueno, Azumino (JP)

(73) Assignee: NTN CORPORATION, Osaka (JP)

( * ) Notice: Subject to any disclaimer, the term of this patent is extended or adjusted under 35 U.S.C. 154(b) by 150 days.

(21) Appl. No.: 15/566,547

(22) PCT Filed: Apr. 7, 2016

(86) PCT No.: PCT/JP2016/061411
§ 371 (c)(1),
(2) Date: Dec. 20, 2017

(87) PCT Pub. No.: WO2016/167177
PCT Pub. Date: Oct. 20, 2016

(65) Prior Publication Data
US 2018/0137962 A1 May 17, 2018

(30) Foreign Application Priority Data

Apr. 15, 2015 (JP) .................................. 2015-083257

(51) Int. Cl.
H01F 7/20 (2006.01)
H01F 13/00 (2006.01)
H01F 27/36 (2006.01)

(52) U.S. Cl.
CPC ......... H01F 13/003 (2013.01); H01F 27/365 (2013.01)

(58) Field of Classification Search
CPC ... H01F 7/00; H01F 7/20; H01F 13/00; G01B 7/30; G01D 5/244; G01D 5/245
(Continued)

(56) References Cited

U.S. PATENT DOCUMENTS 8,436,705 B2  5/2013 Takahashi et al.
9,691,534 B2  6/2017 Takahashi et al.
(Continued)

FOREIGN PATENT DOCUMENTS

EP  2397821 A1  12/2011
JP  2003-59718  2/2003
(Continued)

OTHER PUBLICATIONS

Office Action dated Sep. 11, 2018 in corresponding Japanese Patent Application No. 2015-083257, 14 pgs.
(Continued)

Primary Examiner — Shawki S Ismail
Assistant Examiner — Lisa N Homza

(57) ABSTRACT

A magnetizing device includes a magnetization yoke including a pair of magnetization heads confronting each other through a magnetic gap, an excitation coil wound around the magnetization yoke, and a magnetization power supply that supplies a magnetizing current to the excitation coil to generate magnetic flux between the magnetization heads. A magnetic shield is provided on the magnetization yoke. The magnetic shield is spaced apart from one of the magnetization heads with a gap being formed therebetween along a direction in which the plurality of magnetic encoder tracks are arranged. The magnetic shield blocks a flow of magnetic flux that is present outside a defined extension of a flow of the magnetic flux between the pair of magnetization heads. The magnetic shield is of such a geometry that a thickness thereof progressively decreases towards the one of the magnetization heads.

10 Claims, 12 Drawing Sheets

(58) Field of Classification Search
USPC .......................................................... 335/284
See application file for complete search history.

(56) References Cited

U.S. PATENT DOCUMENTS

| | | | | |
|---|---|---|---|---|
| 2007/0164733 | A1* | 7/2007 | Kabashima | G01D 5/145 |
| | | | | 324/207.25 |
| 2007/0182406 | A1* | 8/2007 | Yarimizu | G01D 5/145 |
| | | | | 324/207.25 |
| 2009/0315544 | A1* | 12/2009 | Takahashi | F16C 41/007 |
| | | | | 702/155 |
| 2010/0225309 | A1* | 9/2010 | Takahashi | G01D 5/145 |
| | | | | 324/207.25 |
| 2011/0158570 | A1* | 6/2011 | Takahashi | F16C 41/007 |
| | | | | 384/446 |
| 2011/0291780 | A1* | 12/2011 | Takahashi | G01D 5/2451 |
| | | | | 335/284 |
| 2012/0105055 | A1* | 5/2012 | Takahashi | F16C 41/007 |
| | | | | 324/207.25 |
| 2013/0063138 | A1* | 3/2013 | Takahashi | G01D 5/24438 |
| | | | | 324/207.25 |
| 2015/0243427 | A1* | 8/2015 | Takahashi | H01F 13/003 |
| | | | | 335/284 |

FOREIGN PATENT DOCUMENTS

| | | |
|---|---|---|
| JP | 4024472 | 10/2007 |
| JP | 2014-38939 | 2/2014 |

OTHER PUBLICATIONS

Extended European Search Report dated Nov. 27, 2018 in corresponding European Patent Application No. 16779968.3.
Japanese Decision of Grant dated Nov. 20, 2018 in corresponding Japanese Application No. 2015-083257.
International Preliminary Report on Patentability dated Oct. 26, 2017 in corresponding International Patent Application No. PCT/JP2016/061411.
International Search Report dated May 10, 2016 in corresponding International Patent Application No. PCT/JP2016/061411.

* cited by examiner

W>L

W<L

MAGNETIZING DEVICE FOR MAGNETIC ENCODER

CROSS REFERENCE TO THE RELATED APPLICATIONS

This application is a U.S. National Stage Application which claims the benefit under 35 U.S.C. 371 of PCT International Application No. PCT/JP2016/061411, filed Apr. 7, 2016, which claims the foreign priority benefit under 35 U.S.C. § 119 to Japanese patent application No. 2015-083257, filed Apr. 15, 2015, the entire disclosures of which are herein incorporated by reference as a part of this application.

BACKGROUND OF THE INVENTION

Field of the Invention

The present invention relates to a magnetizing device for a magnetic encoder, where the magnetic encoder is intended to be used for detection of rotation or a rotational angle of a variety of mechanical components.

Description of Related Art

Patent Document 1 discloses a technique for manufacturing a magnetic encoder that is magnetized with a plurality of magnetic poles. Also, Patent Document 2 discloses, as a development of the technique disclosed in the Patent Document 1, a technique for magnetizing a plurality of adjoining magnetic encoder tracks with precision. More specifically, the technique disclosed in the Patent Document 2 attempts to increase magnetization precision by providing a magnetic shield to block a flow of magnetic flux that is going into a magnetic encoder track other than the target track, thereby eliminating possible influence on an adjacent magnetic encoder track during magnetization.

RELATED DOCUMENT

Patent Document

[Patent Document 1] Japanese Patent No. 4024472
[Patent Document 2] JP Laid-Open Patent Publication No. 2014-038939

SUMMARY OF THE INVENTION

In an example of the magnetizing device disclosed in the Patent Document 2, a magnetic shield 11 is provided on a magnetic yoke 6 in such a way that magnetic flux is diverted from a left magnetization head 6a into the magnetic shield 11 and is directed through a magnetic path generating member 10 towards a right magnetization head 6a. This arrangement might pose the following challenges.

Namely, smaller magnetic resistance between the left magnetization head 6a and the magnetic shield 11 leads to increased flowability of the magnetic flux. However, this also results in corresponding reduction of magnetic flux that is introduced into a magnetic encoder track 3 or 4, thereby leading to decreased magnetization strength. Conversely, greater magnetic resistance between the magnetization head 6a and the magnetic shield 11 leads to an increased chance of the occurrence of magnetic saturation at the magnetic shield 11, resulting in less shielding effect that makes it difficult to perform magnetization with precision. As such, it is challenging to provide a suitable magnetic shield 11 that can achieve good balance between magnetization strength and magnetization precision.

An object of the present invention is to provide a magnetizing device for a magnetic encoder, which can perform precise magnetization of a plurality of magnetic encoder tracks that are arranged so as to adjoin each other, without decreasing magnetization strength and while reducing possible influence on an adjacent magnetic encoder track.

A magnetizing device for a magnetic encoder according to the present invention is operable to magnetize an annular magnetic body that integrally has a plurality of unmagnetized annular magnetic encoder tracks arranged so as to adjoin each other, by causing the annular magnetic body to rotate to magnetize circumferential portions of the annular magnetic body one at a time, thereby producing a magnetic encoder with the magnetic encoder tracks, which have respective magnetic patterns formed thereon that are different from each other. The magnetizing device includes: a magnetization yoke including a pair of magnetization heads magnetically confronting each other through a magnetic gap, the magnetization yoke being configured to magnetize a magnetic encoder track of the magnetic encoder, the magnetic encoder track being arranged in a defined location and position relative to the magnetization heads; an excitation coil wound around the magnetization yoke; a magnetization power supply configured to supply a magnetizing current to the excitation coil to generate magnetic flux between the pair of magnetization heads; and a magnetic shield provided on the magnetization yoke, the magnetic shield being spaced apart from one of the magnetization heads with a gap being formed therebetween along a direction in which the plurality of the magnetic encoder tracks are arranged, and being configured to block a flow of magnetic flux that is present outside a defined extension of a flow of the magnetic flux between the magnetization heads. The magnetic shield is of such a geometry that a thickness thereof progressively decreases towards the one of the magnetization heads. The expression that "a defined extension of a flow of the magnetic flux between the magnetization heads" refers to an extension of a flow of magnetic flux that magnetizes a target magnetic encoder track.

With such a configuration, a flow of magnetic flux that is present outside a defined extension of a flow of the magnetic flux between the magnetization heads can be blocked due to the provision of the magnetic shield. In this way, a magnetic encoder track that is adjacent to a target magnetic encoder track can be protected from possible influence of leakage magnetic flux emanating from the magnetization heads. Furthermore, it may facilitate magnetization of a plurality of magnetic encoder tracks by allowing the relative position between the magnetization heads and the magnetic encoder tracks to be varied.

Magnetic resistance between a magnetization head and a magnetic shield correlates with a gap formed between the magnetization head and the magnetic shield and with the geometry of the magnetic shield. Generally, the magnetic resistance decreases with a smaller dimension of the gap, and the magnetic resistance also decreases with a larger value of a surface area of the magnetic shield that opposes the magnetization head. Moreover, a more stable flow of magnetic flux can be realized with such a smaller dimension of the gap formed between the magnetization head and the magnetic shield. With the aforementioned configuration in which the magnetic shield is of such a geometry that a thickness thereof progressively decreases towards the one of the magnetization heads, the gap formed between the one of the magnetization heads and the magnetic shield can be narrowed without lowering the magnetic resistance too much while at the same time maintaining the magnetic resistance at an appropriate level, thereby stabilizing a flow of the magnetic flux. In other words, magnetic saturation at the magnetic shield can be avoided, thus effectively introducing magnetic flux into a target magnetic encoder track. In this way, magnetization of a plurality of magnetic encoder tracks that are arranged so as to adjoin each other can be performed with precision, without decreasing magnetization strength and while eliminating possible influence on an adjacent magnetic encoder track.

In one embodiment of the present invention, the magnetic shield may be of such a geometry that a thickness thereof progressively decreases in a continuous fashion towards the one of the magnetization heads. Alternatively, the magnetic shield may be of such a geometry that a thickness thereof progressively decreases in a stepwise fashion towards the one of the magnetization heads. In any case, the aforementioned effect and advantage can be obtained.

In one embodiment of the present invention, two magnetic shields may be disposed on opposite sides of the one of the magnetization heads along a direction in which the magnetic encoder tracks are arranged such that the one of the magnetization heads is interposed between the two magnetic shields. In this case, opposite sides of a target magnetic encoder track can be protected from possible influence of leakage magnetic flux emanating from the magnetization heads.

In one embodiment of the present invention, the gap between the magnetic shield and the one of the magnetization heads may be equal to or greater than 0.5 mm and equal to or smaller than 2 mm. If the gap is equal to or less than 0.5 mm, magnetic resistance in the gap decreases, thereby increasing the flowability of magnetic flux from the one of the magnetization heads into the magnetic shield. In such a case, less magnetic flux is introduced into a magnetic encoder track, thus possibly decreasing magnetization strength. Also, if the gap is equal to or more than 2 mm, less shielding effect is available, thus making it difficult to perform magnetization with precision. By designing a dimension of the gap to be in the aforementioned range, magnetic resistance in the gap can be maintained at an appropriate level.

Any combination of at least two features disclosed in the appended claims and/or the specification and/or the accompanying drawings should be construed as being included within the scope of the present invention. In particular, any combination of at least two claims from the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts or corresponding parts throughout the different figures, and:

DESCRIPTION OF EMBODIMENTS

One embodiment of the present invention will be described in connection with FIG. 1A and FIG. 1B to FIG. 8.

A magnetizing device in accordance with embodiments of the present invention may be employed, for example, as a magnetizing device for a magnetic encoder, where the magnetic encoder is intended to be used for detection of rotation or a rotational angle of a variety of mechanical components. The description that follows also includes a description of a magnetic encoder and of a method for magnetizing the magnetic encoder.

Figure 1A:
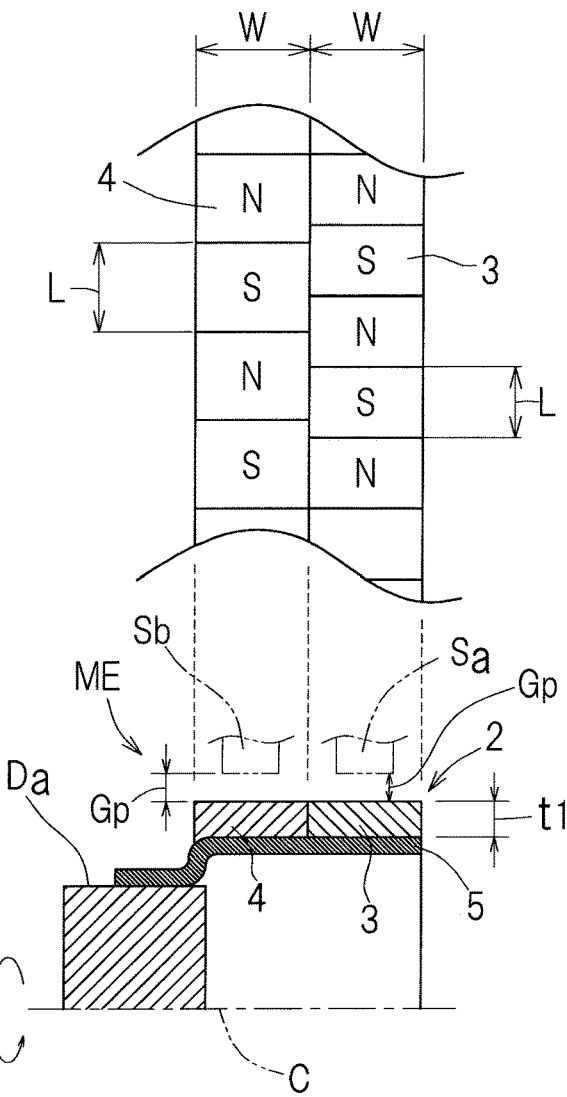
FIG. 1A shows a cross sectional view of a radial type magnetic encoder and a development view of magnetic encoder tracks thereof, in accordance with one embodiment of the present invention.
Figure 1B:
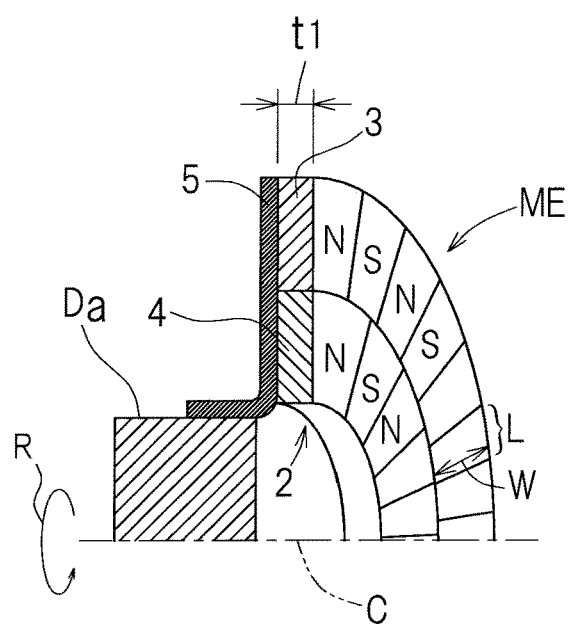
FIG. 1B shows a perspective view of an axial type magnetic encoder, in accordance with one embodiment of the present invention.
Figure 3A:
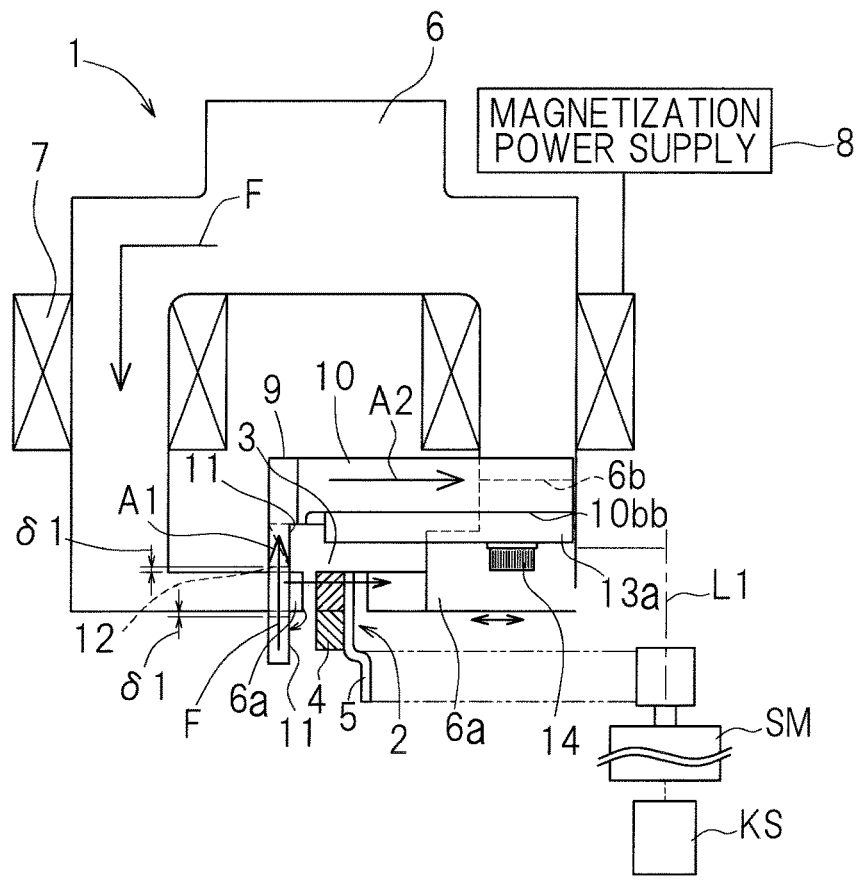
FIG. 3A shows a schematic configuration of a magnetizing device that is employed to a radial type magnetic encoder, in accordance with one embodiment of the present invention.
Figure 3B:
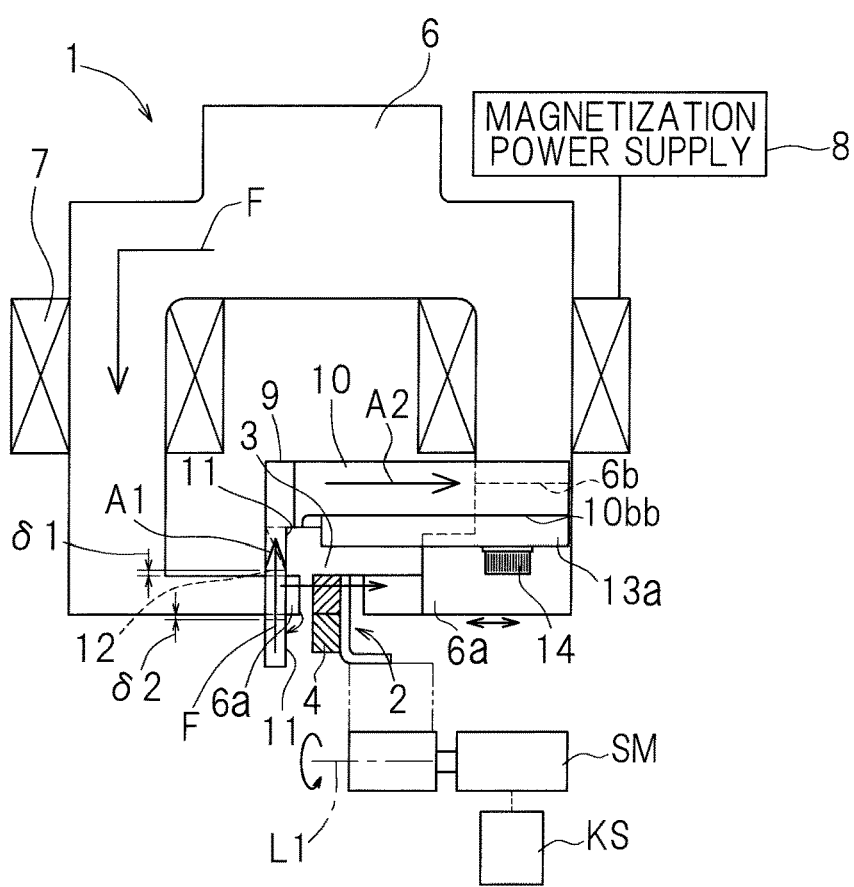
FIG. 3B shows an example in which the magnetizing device is employed to an axial type magnetic encoder.

As shown in FIG. 3A and FIG. 3B, the magnetizing device 1 is operable to magnetize an annular magnetic body 2, such that the annular magnetic body 2 is magnetized with one magnetic pole at a time by causing the annular magnetic body 2 to rotate about an axis L1 of rotation thereof, thereby producing a magnetic encoder ME such as, for example, those illustrated in FIG. 1A and FIG. 1B. The annular magnetic body 2 integrally has a plurality of unmagnetized annular magnetic encoder tracks 3 and 4, which are arranged so as to adjoin each other. The annular magnetic body 2 is designed such that the plurality of magnetic encoder tracks 3 and 4 are arranged on a surface of a disc shaped (FIG. 1B) or cylinder shaped (FIG. 1A) core member 5 so as to adjoin each other and so as to be coaxial with each other. For instance, as shown in FIG. 1B, a magnetic encoder ME produced by magnetization of an axial type annular magnetic body 2 may be mounted onto an outer peripheral surface Da of, for example, a bearing rotational ring by force-fitting a cylindrical portion of the core member 5 thereto. The magnetic encoder tracks 3 and 4 may be, for example, made of rubber, plastic or a sintered material containing a magnetic powder, which will constitute, for example, a rubber magnet, a plastic magnet, or a sintered magnet upon magnetization, respectively. It should be noted that the annular magnetic body 2 is not limited to that of an axial type, but may also be that of a radial type such as shown in FIG. 1A.

A magnetic encoder design is now discussed.

A radial type magnetic encoder ME such as shown in FIG. 1A may be designed such that each magnetic encoder track 3 or 4 has a respective track width W of, for example, equal to or greater than 1 mm and equal to or smaller than 5 mm as well as a respective magnetic pole length L of, for example, equal to or greater than 0.3 mm and equal to or smaller than 5 mm. Each of the track width W is a width of each track as measured along a direction in which the tracks are arranged, where the direction extends perpendicular to a rotational direction R of the magnetic encoder ME. The "direction in which the tracks are arranged, where the direction extends perpendicular to a rotational direction R" in the context of FIG. 1A is meant to indicate a direction parallel to an axis of rotation C of the magnetic encoder ME. Each of the magnetic pole length L is a length of each magnetic pole of a magnetic pattern as measured along the rotational direction R of the magnetic encoder ME. It should be noted that the magnetic encoder may include three or more tracks. It should also be noted that the magnetic encoder may contain a non-magnetized zone between adjacent tracks. Furthermore, the width W of each of the tracks may not necessarily be equal to each other.

Figure 2A:
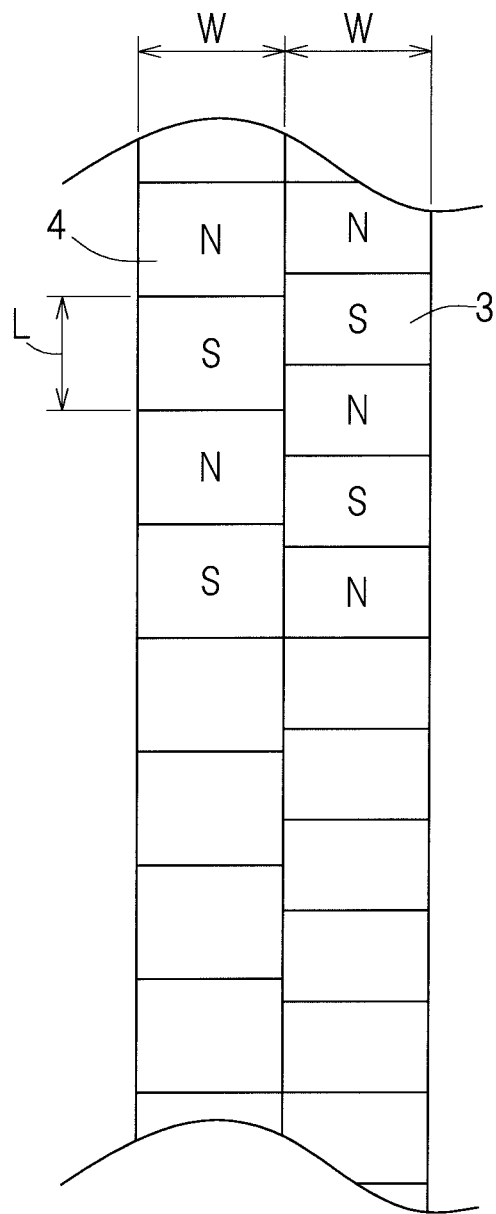
FIG. 2A shows a diagram illustrating a relationship between a respective track width and a magnetic pole length of the magnetic encoder.
Figure 2B:
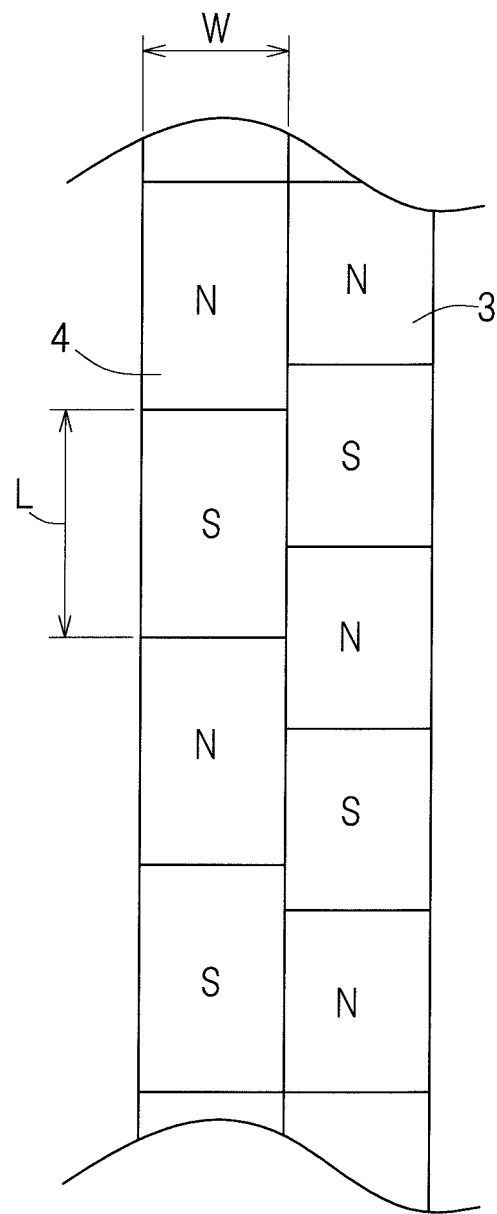
FIG. 2B shows a reference diagram illustrating a relationship between a respective track width and a magnetic pole length of the magnetic encoder.

As shown in FIG. 2A, the respective track widths W and the respective magnetic pole lengths L may be designed to satisfy the relationship: W>L. As will be discussed later, the magnetic encoder tracks 3 and 4 may have respective magnetic patterns formed thereon that are different from each other. Also in the case of an axial type magnetic encoder ME—similarly to the aforementioned radial type—the respective track widths W may be designed to be equal to or greater than 1 mm and equal to or smaller than 5 mm, and the respective magnetic pole lengths L may be designed to be equal to or greater than 0.3 mm and equal to or smaller than 5 mm. Furthermore, such a magnetic encoder may also be designed to satisfy the relationship of W>L. Moreover, the "direction in which the tracks are arranged, where the direction extends perpendicular to a rotational direction R" in the context of FIG. 1B is meant to indicate a direction perpendicular to an axis of rotation C of the magnetic encoder ME.

The magnetic encoder tracks 3 and 4 that are illustrated in FIG. 1A and FIG. 1B may be formed of a magnet that is molded in a ferrite sintering process (i.e. a so-called ferrite sintered magnet), or may be formed of a magnet that is molded with a mixture of rubber and a ferrite magnetic powder or with a mixture of resin and a ferrite magnetic powder. The magnetic encoder tracks 3 and 4 may be formed of a rare earth magnet, but a ferrite magnet is preferred in terms of cost. The thickness t of the magnetic encoder tracks 3 and 4 may be designed to be more than 0.5 mm and less than 4 mm. Moreover, in operation, the magnetic encoder ME may be positioned such that a detectable surface thereof is spaced apart from sensors Sa and Sb (FIG. 1A) that read magnetic signals from respective magnetic encoder tracks 3 and 4, with an air gap Gp being formed therebetween, where the air gap Gp is more than 0.3 mm and less than 4 mm.

As shown in FIG. 3A and FIG. 3B, the magnetizing device 1 may include a magnetization yoke 6, an excitation coil 7, a magnetization power supply 8 and a magnetic shield forming member 9. The magnetizing device 1 may also include a spindle unit SM configured to rotate in an indexable manner the annular magnetic body 2 about the axis of rotation of the magnetic encoder ME and a shifter unit KS configured to shift a magnetizing position of a magnetic encoder track relative to a pair of confronting ends 6a and 6a. A main body of the spindle unit SM may be coupled to the shifter unit KS. For example, the shifter unit KS may include a hydraulic cylinder. In the example under discussion, the spindle unit SM may be caused to be displaced to shift the magnetizing position of a magnetic encoder track. Alternatively, the magnetization yoke 6 may be caused to be displaced to shift the magnetizing position of a magnetic encoder track.

Figure 5:
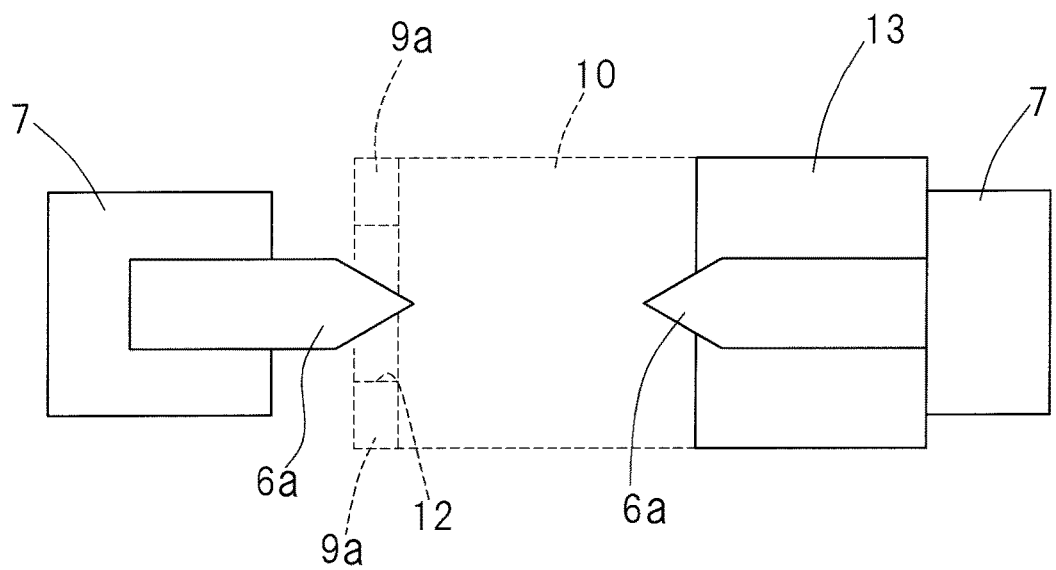
FIG. 5 shows a plan view of a part of the magnetizing device.

As shown in FIG. 5, the magnetization yoke 6 includes a pair of magnetization heads 6a and 6a, where the magnetization heads 6a and 6a confront each other through a magnetic gap. Each of the magnetization heads 6a may be designed to be of a shape that, as viewed in a cross section thereof, tapers towards a tip end thereof. As shown in FIG. 3A and FIG. 3B, the excitation coil 7 is wound around the magnetization yoke 6. The magnetization power supply 8 is configured to supply a magnetizing current to the excitation coil 7 to generate magnetic flux between the magnetization heads 6a and 6a. One magnetic encoder track 3 (4), which is a target track, on the annular magnetic body 2 is positioned in the magnetic gap. Thus, the target one magnetic encoder track (a magnetic encoder track 3 in the examples of FIG. 3A and FIG. 3B) is positioned between the magnetization heads 6a and 6a so as to define a clearance from the magnetization heads 6a and 6a, in order to introduce magnetic flux into this particular unmagnetized magnetic encoder track (a magnetic encoder track 3 in the examples of FIG. 3A and FIG. 3B) for magnetization. Here, for instance, indexable rotation can be effected by the spindle unit SM while the spindle unit SM is supporting the annular magnetic body 2, so that the one magnetic encoder track 3 is alternately magnetized with N and S magnetic poles along a circumferential direction thereof. Next, the shifter unit KS can cause the other magnetic encoder track 4 to be positioned between the pair of the magnetization heads 6a and 6a. Then, indexable rotation of the other magnetic encoder track 4 can be likewise effected by the spindle unit SM, so that it can be magnetized along a circumferential direction thereof.

Figure 4:
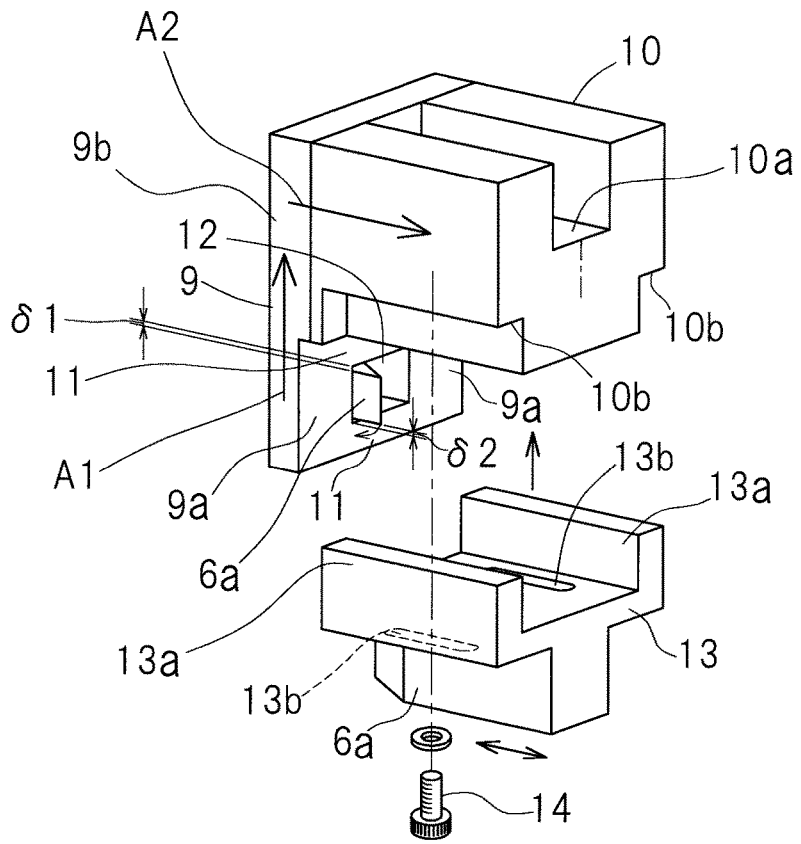
FIG. 4 shows an exploded perspective view of a component and of a magnetic path generating member of the magnetizing device.

As shown in FIG. 3A, FIG. 3B and FIG. 4, the magnetic shield forming member 9 may be removably coupled to a magnetic path generating member 10 that is provided on the magnetization yoke 6. Coupling between the magnetic shield forming member 9 and the magnetic path generating member 10 may be carried out by means of bolts 15, such as, for example, shown in FIG. 6, FIG. 7A and FIG. 7B. Both of the magnetic shield forming member 9 and the magnetic path generating member 10 may be entirely made of ferromagnetic material. In the embodiment under discussion, the magnetic path generating member 10 is provided on one of the magnetization heads that form free end portions of the magnetization yoke 6—in particular, with a right magnetization head 6a in the context of the examples of FIG. 3A, FIG. 3B and FIG. 5 at a base end segment 6b located adjacent to the right magnetization head 6a.

Figure 6:
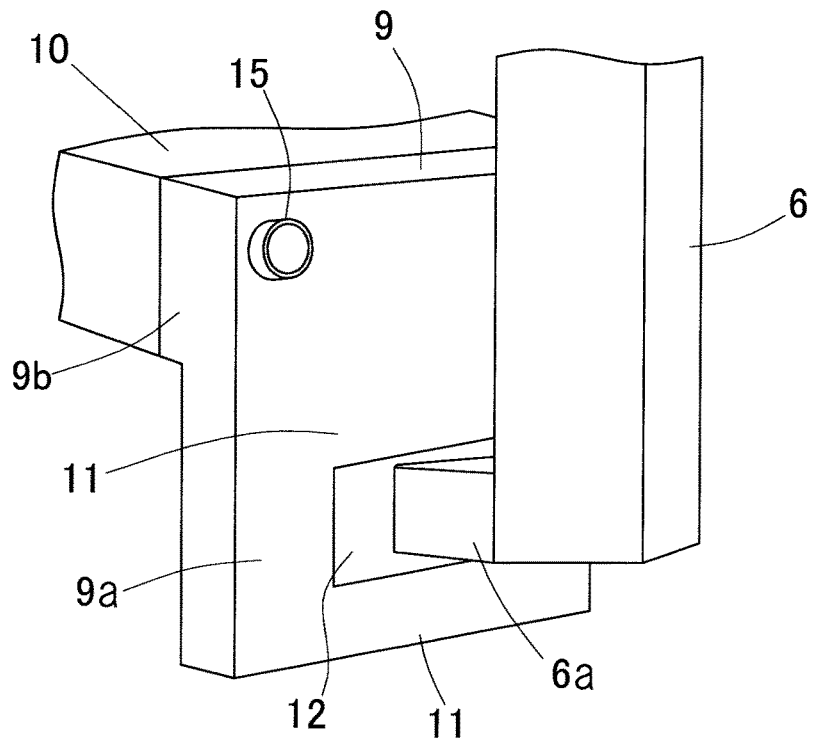
FIG. 6 shows a perspective view of a part of the magnetizing device.
Figure 7A:
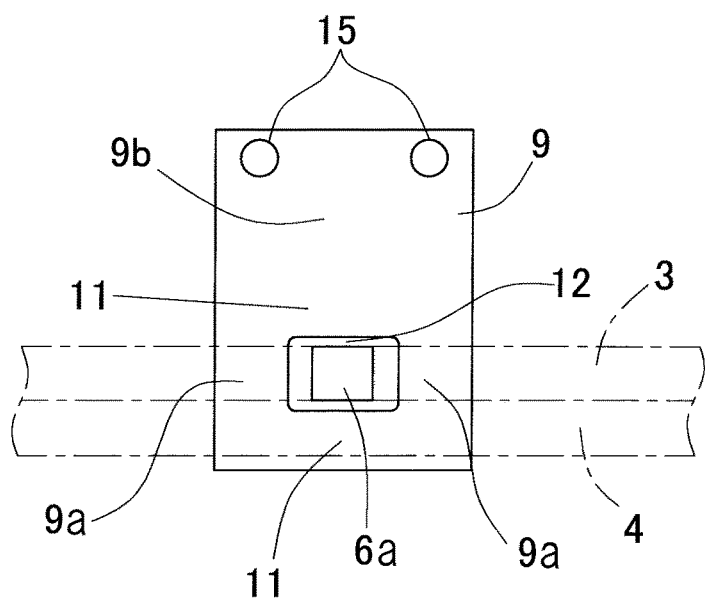
FIG. 7A shows a front elevational view of a magnetic shield forming member of the magnetizing device.
Figure 7B:
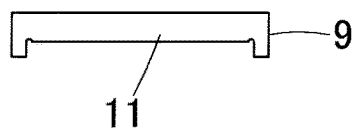
FIG. 7B shows a bottom view of the magnetic shield forming member of the magnetizing device.

The magnetic shield forming member 9 may include two magnetic shields 11 and 11 that is disposed in a neighboring relation on both, upper and lower sides of a left magnetization head 6a as illustrated in FIG. 3A, FIG. 3B and FIG. 5, the both, upper and lower sides being arranged along a direction in which the plurality of magnetic encoder tracks 3 and 4 are arranged. The magnetic shields 11 are designed to block a flow of magnetic flux that is going into a magnetic encoder track 3 (4) other than the target track. In the case of an axial type annular magnetic body 2, the direction in which the magnetic encoder tracks 3 and 4 are arranged is parallel to the axis L1 of rotation of the annular magnetic body 2. As shown in FIG. 6, FIG. 7A and FIG. 7B, the two magnetic shields 11 and 11 may define upper and lower portions that form a rectangular through opening 12 which is arranged in a lower part of the magnetic shield forming member 9. A left magnetization head 6a may be inserted through the through opening 12.

Figure 8:
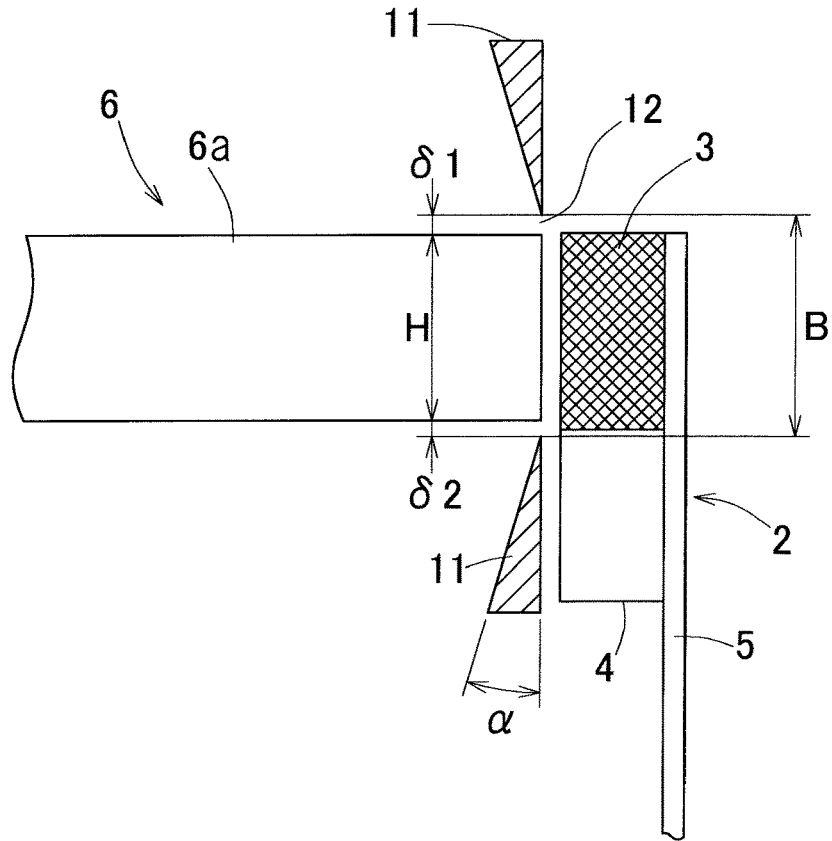
FIG. 8 shows a cut-away side view of a detail of the magnetizing device.

As shown in FIG. 8, the two magnetic shields 11 and 11 may be designed to have such geometries that thicknesses thereof progressively decrease towards the magnetization head 6a. In the embodiment under discussion, the geometries are such that the thicknesses decrease in a continuous fashion towards the magnetization head 6a—i.e. a knife edge geometry. More specifically, surfaces of the magnetic shields 11 that face towards the magnetic encoder tracks 3 and 4 extend parallel to surfaces of the magnetic encoder tracks 3 and 4, and the opposite surfaces of the magnetic shields 11 are of such shapes that they keep slanting towards the magnetic encoder tracks 3 and 4 towards the magnetization head 6a. The slanting angle α of the opposite surfaces is, for example—though not limited to—30°.

A dimension B of the through opening 12, as measured along a direction in which the plurality of the magnetic encoder tracks 3 and 4 are arranged, may be a sum of a thickness H of the magnetization head 6a as measured along such a direction (vertical direction) and respective gaps δ1 and δ2 between the two magnetic shields 11 and the magnetization head 6a (B=H+δ1+δ2). Preferably, as will be discussed later in more detail, the dimension of each of the gaps δ1 and δ2 is designed to be equal to or greater than 0.5 mm and equal to or smaller than 2 mm, in order to achieve good balance between magnetization strength and magnetization precision.

As shown in FIG. 4, portions of the magnetic shield forming member 9 that define lateral portions of the through opening 12 may be designed as first magnet path generating portions 9a and 9a. An upper part of the magnetic shield forming member 9 to which upper ends of the first magnetic path generating portions 9a and 9a are joined may be designed as a second magnetic path generating portion 9b. By coupling the magnetic shield forming member 9 to the magnetic path generating member 10, the first magnetic path generating portions 9a and 9a, the second magnetic path generating portion 9b and the magnetic path generating member 10 can cooperate to generate a magnetic path for directing magnetic flux that is diverted via the magnetic shields 11 and 11 from a left magnetization head 6a, towards a segment having magnetic pole polarity which is the same as that of a right magnetization head 6a. In this way, as indicated by arrows A1 and A2 in FIG. 3A, FIG. 3B and FIG. 4, magnetic flux F can be sequentially directed via the first magnetic paths 9a and 9a, the second magnetic path 9b and the magnetic path generating member 10 towards the base end segment 6b located adjacent to the magnetization head 6a.

In the embodiment under discussion, the magnetic path generating member 10 is provided integrally with the base end segment 6b of the magnetization yoke 6 that is located adjacent to a right magnetization head 6a. Alternatively, a concave portion 10a of the magnetic path generating member 10 as illustrated in FIG. 4 may be removably mounted to the base end segment 6b defining a convex portion.

Furthermore, a right magnetization head 6a may be designed to be movable closer to or away from a left magnetization head 6a. For example, the magnetic path generating member 10 has a bottom surface, lateral sides of which are formed with guidable portions 10b and 10b. Each of the guidable portions 10b runs along a transverse direction in which the magnetization heads 6a and 6a of the magnetization yoke 6 confront each other. A right magnetization head 6a can have an upper surface that is integrally formed with a guide segment 13 defining a recess as viewed in a cross section thereof. The guide segment 13 may include guide portions 13a and 13a that can be slidably guided in the guidable portions 10b and 10b. Portions of the lateral edges of the guide segment 13 that are located adjacent to the respective guide portions 13 may have longitudinal slots 13b and 13b formed therein, into which bolts 14 is inserted. Accordingly, by moving and adjusting a right magnetization head 6a along the guidable portions 10b and 10b, the annular magnetic body 2 to be magnetized is positioned between the magnetization heads 6a and 6a while also allowing the magnetic gap to be adjusted. Upon the adjustment of the magnetic gap, a right magnetization head 6a may be fastened to the magnetic path generating member 10 by means of, for example, a pair of the bolts 14.

FIG. 10A to FIG. 10D show respective examples of a magnetic pole pattern that is magnetized—by employing, for example, the aforementioned indexing magnetization process—on each magnetic encoder track of the annular magnetic body.

Figure 10A:
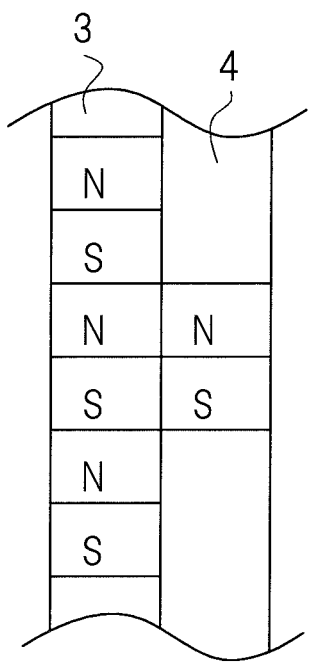
FIG. 10A shows an example of a magnetic pole pattern that is magnetized on each magnetic encoder track.

In the pattern example of FIG. 10A, one magnetic encoder track 3 is alternately magnetized with magnetic poles of equal pitch having different polarities, and is therefore designed as a track for detection of rotation. The other magnetic encoder track 4 has a portion (or a plurality of portions) of a circumference thereof that is magnetized with magnetic poles for detection of a rotational reference position, and is therefore designed as a track for generation of a Z phase signal where a Z phase signal indicating a rotational reference position can be generated.

Figure 10B:
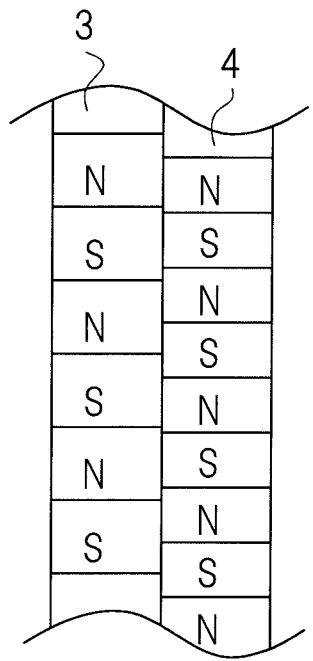
FIG. 10B shows an example of a magnetic pole pattern that is magnetized on each magnetic encoder track.

In the pattern example of FIG. 10B, one magnetic encoder track 3 is alternately magnetized with magnetic poles of equal pitch having different polarities, and is therefore designed as a track for detection of rotation. The other magnetic encoder track 4 is also alternately magnetized with magnetic poles of equal pitch having different polarities. However, the number of the magnetic poles is different from that of the aforementioned track for detection of rotation. In this way, the other magnetic encoder track 4 is designed as another track for detection of rotation.

Figure 10C:
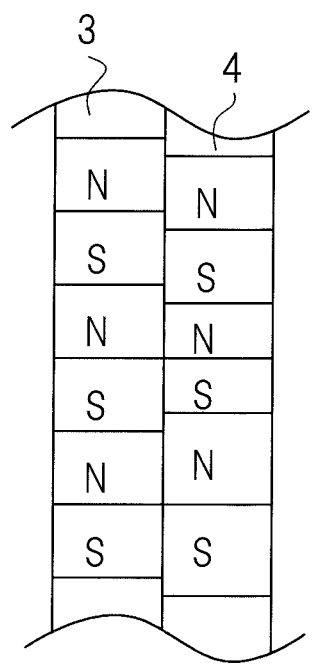
FIG. 10C shows an example of a magnetic pole pattern that is magnetized on each magnetic encoder track.

In the pattern example of FIG. 10C, one magnetic encoder track 3 is alternately magnetized with magnetic poles of equal pitch having different polarities, and is therefore designed as a track for detection of rotation. The other magnetic encoder track 4 is alternately magnetized with magnetic poles having different polarities, and the number of the magnetic poles is the same as that of the aforementioned track for detection of rotation. However, the phases of the magnetic poles are offset with respect to those of the aforementioned track for detection of rotation. In this way, the other magnetic encoder track 4 is designed as another track for detection of rotation.

Figure 10D:
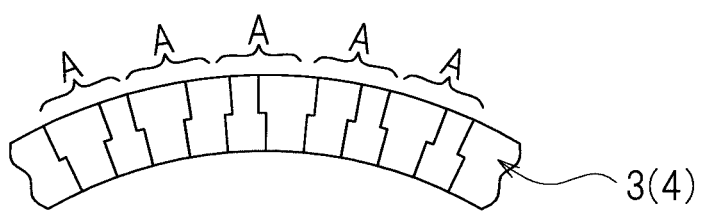
FIG. 10D shows an example of a magnetic pole pattern that is magnetized on each magnetic encoder track.

In the pattern example of FIG. 10D, an axial type annular magnetic body has a magnetic encoder track 3 (4) magnetized in such a way that the width of an N pole and the width of an S pole of each of magnetic pole pairs A are different from each other in an outer peripheral half of the track—that is, the widths of the N and S poles for a radially outer side thereof are different from the widths of the N and S poles for a radially inner side thereof—for the purpose of generating a pattern that is similar to the one in the example of FIG. 10C.

As mentioned earlier, the air gap Gp between the magnetic sensors that read a magnetic signal from respective magnetic encoder tracks 3 and 4 and a surface of the magnetic encoder tracks that defines the detectable surface may be in the range of 0.3 mm to 4 mm. If the air gap Gp is equal to or less than 0.3 mm, the magnetic sensors may collide with the magnetic encoder tracks 3 and 4 that may contain rubber or resin. If the air gap Gp is equal to or more than 4 mm, undesirable effects arising from possible weak magnetization strength or from possible errors induced by magnetic interference between the respective magnetic encoder tracks 3 and 4 may be inevitable.

Although magnetic field strength as sensed by the sensors can vary depending on the value of the air gap Gp, satisfactory detection is possible by roughly designing the respective track width W and the magnetic pole length L of each of the magnetic encoder tracks 3 and 4 to be in the range of 1 to 5 mm and in the range of 0.3 to 5 mm, respectively. The relationship between W and L may be designed to satisfy the formula: W>L. If, as shown in the reference diagram of FIG. 2B, the formula: W<L held true, possible errors induced by magnetic interference between the plurality of the magnetic encoder tracks 3 and 4 would relatively be worsened. This might result in poorer accuracy especially with a smaller value of W.

On the other hand, the thickness t (i.e. a thickness of the magnet) of the magnetic encoder tracks may be designed to be in the range of 0.5 mm to 4 mm. If the thickness of the magnetic encoder tracks 3 and 4 is equal to or less than 0.5 mm, greater diamagnetic field inside the magnetized magnetic encoder tracks will tend to cause irreversible demagnetization at elevated temperatures, thereby resulting in a less reliable magnet. If the thickness of the magnetic encoder tracks 3 and 4 is equal to or more than 4 mm, a longer distance between the magnetization heads 6a and 6a may be required, thereby making it more difficult to introduce adequate magnetic flux into a target magnetic encoder track. Despite the aforementioned complex magnetic patterns, the annular magnetic body 2 can be magnetized with one magnetic pole at a time by causing the annular magnetic body 2 to rotate and generating magnetic flux between the magnetization heads 6a and 6a, thus successfully magnetizing a desired, target magnetic encoder track. During this step, a magnetic shield 11 blocks a flow of magnetic flux that is going into a magnetic encoder track other than the target track.

Figure 11A:
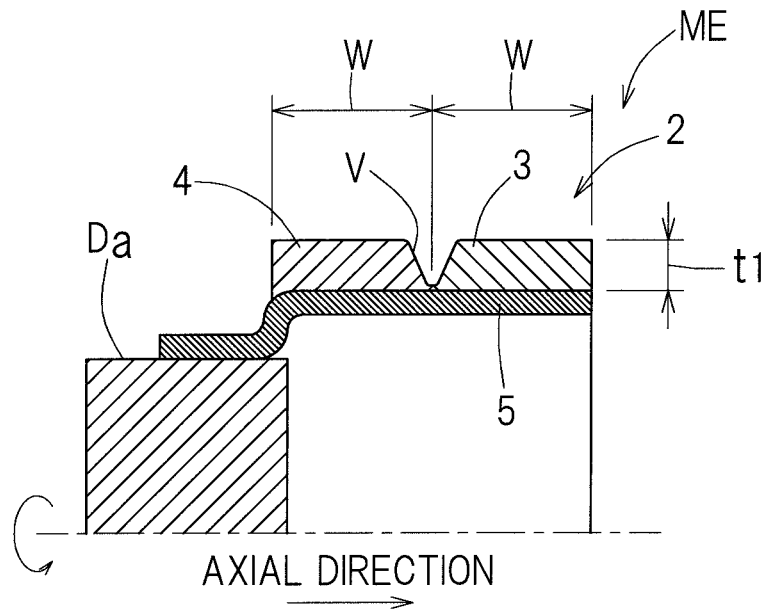
FIG. 11A shows a cross sectional view of a partial modification of the geometry of a radial type magnetic encoder.
Figure 11B:
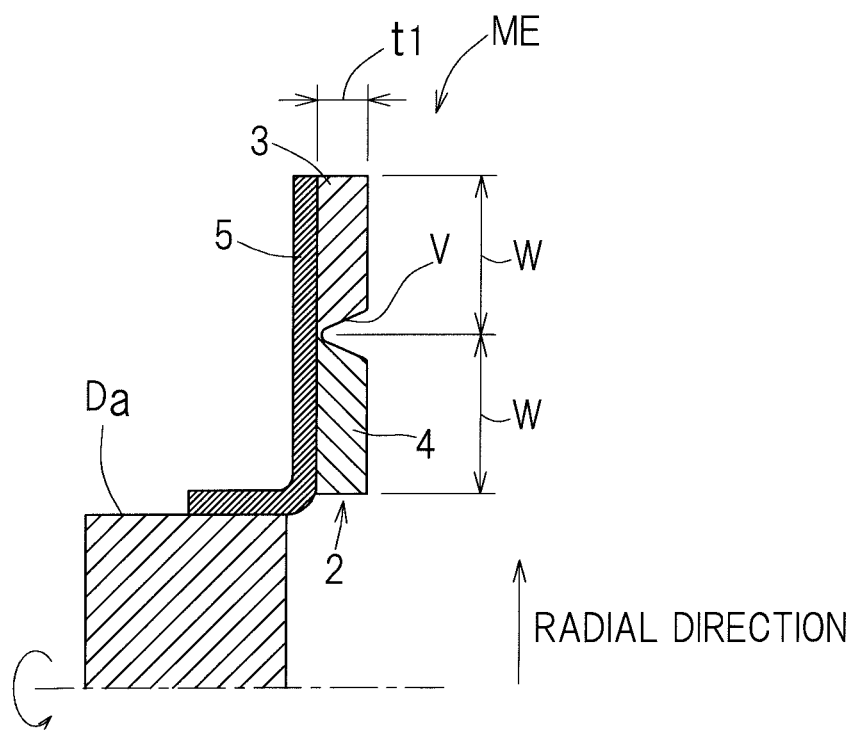
FIG. 11B shows a cross sectional view of a partial modification of the geometry of an axial type magnetic encoder.

FIG. 11A shows a cross sectional view of a partial modification of the geometry of a radial type magnetic encoder ME, while FIG. 11B shows a cross sectional view of a partial modification of the geometry of an axial type magnetic encoder ME. As shown in these figures, the magnetic encoder ME may be designed to have a notch V between a plurality of magnetic encoder tracks 3 and 4. The notch V may have such a V cross sectional shape that the width of the notch V narrows towards a bottom thereof. The provision of the notch V may reduce possible mutual influence of the magnetic encoder tracks during a magnetization process and their possible magnetic interference on the sensor detection, thereby enabling the production of a more accurate, plural row magnetic encoder. Furthermore, such a V cross sectional shape of the notch V in which the width of the notch V narrows towards a bottom thereof ensures that respective surfaces of the adjoining magnetic encoder tracks 3 and 4 are spaced apart from each other. The may enable the production of a plural row magnetic encoder that is more accurate than those illustrated in FIG. 1A and FIG. 1B.

Figure 12A:
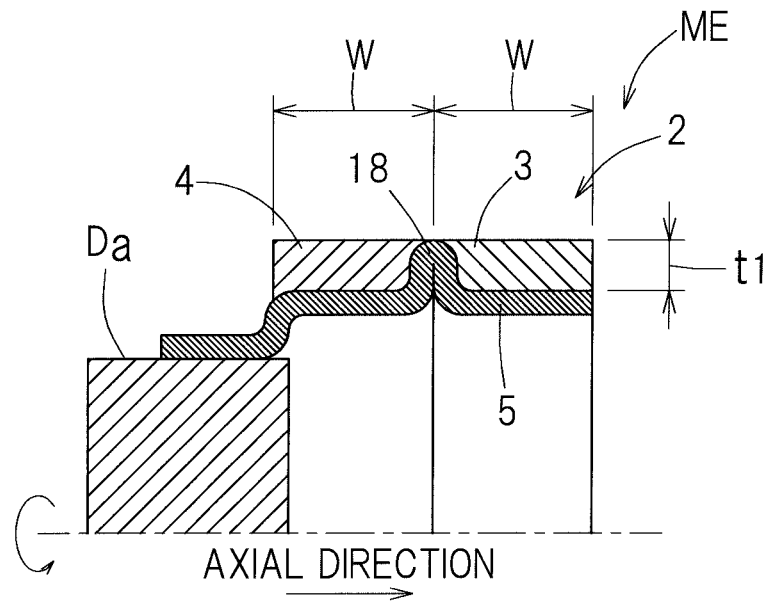
FIG. 12A shows a cross sectional view of another partial modification of the geometry of a radial type magnetic encoder.
Figure 12B:
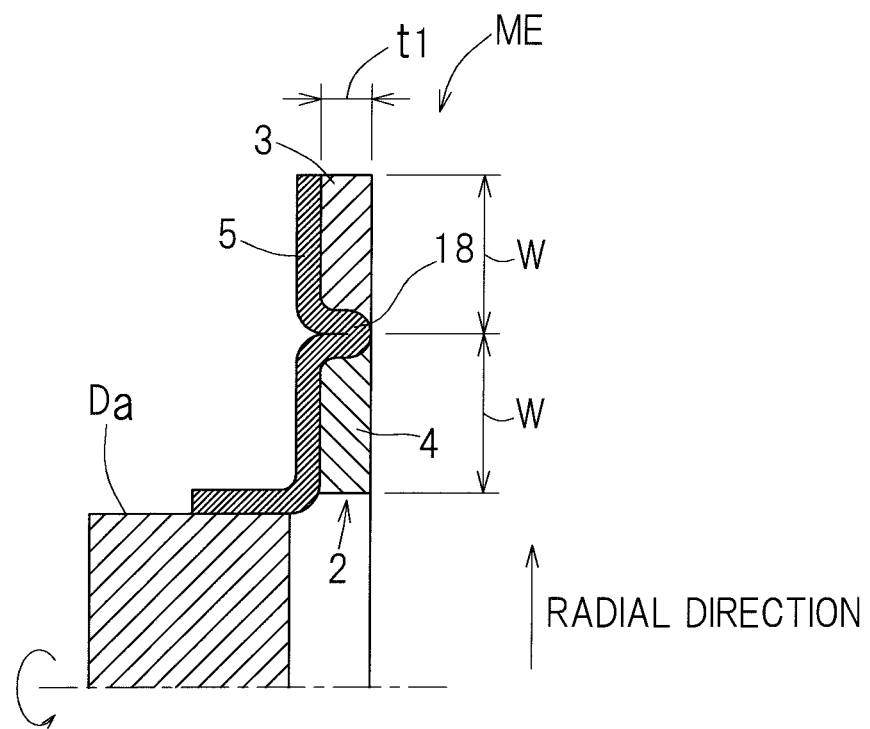
FIG. 12B shows a cross sectional view of another partial modification of the geometry of an axial type magnetic encoder.

Also, as shown in FIG. 12A and FIG. 12B, the magnetic encoder ME may be designed to include a spacer 18 made of magnetic material that is arranged between a plurality of magnetic encoder tracks 3 and 4. Such a spacer 18 made of magnetic material will create a short circuit of leakage magnetic field emanating from either one of the magnetic encoder tracks 3 and 4 to reduce possible mutual magnetic interference between these magnetic encoder tracks 3 and 4, thereby enabling the production of a more accurate, plural row magnetic encoder ME. A magnetizing device with the aforementioned magnetic shields 11 can be used to produce such a magnetic encoder ME with a partially modified geometry by magnetizing a target magnetic encoder track thereon.

In the magnetizing device 1 that has been described above, the magnetization heads 6a and 6a of the magnetization yoke 6 is positioned relative to a plurality of unmagnetized magnetic encoder tracks 3 (4). Note that, at this point, one of the magnetization heads 6a is not fixed to the magnetic path generating member 10. This procedure also allows the magnetic shield forming member 9 to be simultaneously positioned in a predetermined location relative to the magnetic encoder tracks 3 (4), since the magnetic shield forming member 9 is removably coupled to the magnetic path generating member 10 on the magnetic yoke 6. Therefore, no adjustment of the gaps δ1 and δ2 between the magnetization head 6a and the magnetic shields 11 and 11 is necessary. Then, after moving and adjusting a right magnetization head 6a relative to a left magnetization head 6a, the right magnetization head 6a is fastened to the second magnetic path 10b.

Subsequently, the magnetization power supply 8 can supply a magnetizing current to the excitation coil 7 to generate magnetic flux between the magnetization heads 6a and 6a. By causing the annular magnetic body 2 to rotate, the magnetic flux generated between the magnetization heads 6a and 6a magnetizes one magnetic encoder track 3 (4), which is a target track. Here, a magnetic shield 11 blocks a flow of the magnetic flux that is going into an adjacent magnetic encoder track 3 (4).

In other words, the magnetic flux that is possibly leaking into a magnetic encoder track 4 that is adjacent to a target magnetic encoder track 3 is directed from a magnetic shield 11 via the first magnetic path generating portions 9a and 9a, the second magnetic path generating portion 9b and the magnetic path generating member 10 towards a right magnetization head 6a of the magnetization yoke 6. Thus, accidental magnetization of an adjacent magnetic encoder track 4 can be avoided. The magnetic shields 11 and 11 of the magnetic shield forming member 9 are disposed at one of the magnetization heads 6a of the magnetization yoke 6, in such a way that they are arranged in a neighboring relation along a direction in which the plurality of the magnetic encoder tracks 3 and 4 are arranged. Therefore, unlike a magnetic shield forming member (not shown) that is designed to cover a magnetic encoder track 3 or 4, it does not impede the operation of arranging the annular magnetic body 2 between the pair of magnetization heads 6a and 6a of the magnetization yoke 6.

The magnetic shields 11 can allow a target magnetic encoder track 3 (4) to be precisely magnetized without undesirably influencing an adjacent magnetic encoder track 4 (3). Here, furthermore, magnetization of the magnetic encoder tracks 3 (4) can be implemented without necessitating, for example, a decoupling step of the magnetic shield forming member 9 for each magnetization operation, thereby shortening the magnetization operations. The two magnetic shields 11 and 11 are disposed on opposite sides, respectively, of a left magnetization head 6a of the magnetization yoke 6, along a direction in which the plurality of the magnetic encoder tracks 3 and 4 are arranged. In this way, when magnetizing a target magnetic encoder track 3, a lower magnetic shield 11 as viewed along such a direction is used to block a flow of the magnetic flux that is going into a magnetic encoder track 4 other than the target track. Subsequently, when magnetizing the previously blocked magnetic encoder track 4, an upper magnetic shield 11 as viewed along such a direction is used to block a flow of the magnetic flux that is going into the previously magnetized, magnetic encoder track 3. In this way, the magnetization operations can be simplified.

Magnetic resistance between the magnetization head 6a and a magnetic shield 11 or 11 correlates with a gap δ1 or δ2 present between the magnetization head 6a and the magnetic shield 11 or 11 and with the geometry of the magnetic shield 11 or 11. Generally, the magnetic resistance decreases with a smaller dimension of the gap δ1 or δ2, and the magnetic resistance also decreases with a larger value of a surface area of the magnetic shield 11 that opposes the magnetization head 6a. Moreover, a more stable flow of magnetic flux can be realized with such a smaller dimension of the gap present δ1 or δ2. The magnetic resistance Rm between the magnetization head 6a and a magnetic shield 11 is expressed as d/μS. Here, μ stands for magnetic permeability, d stands for the length of magnetic path (i.e. the dimension of a gap δ1 or δ2), and S stands for a cross sectional area of a magnetic shield 11 (i.e. the surface area of a magnetic shield 11 that opposes the magnetization head 6a).

According to the configuration of the embodiment under discussion in which the magnetic shields 11 and 11 are of such geometries that thicknesses thereof progressively decrease towards the magnetization head 6a, the gaps δ1 and δ2 can be narrowed without lowering the magnetic resistance too much while at the same time maintaining the magnetic resistance at an appropriate level, thereby stabilizing a flow of the magnetic flux. In other words, magnetic saturation at the magnetic shields 11 and 11 can be avoided, thus effectively introducing magnetic flux into a target magnetic encoder track 3 or 4. In this way, magnetization of a plurality of magnetic encoder tracks 3 (4) that are arranged so as to adjoin each other can be performed with precision, without decreasing magnetization strength and while eliminating possible influence on an adjacent magnetic encoder track 4 (3).

Figure 9:
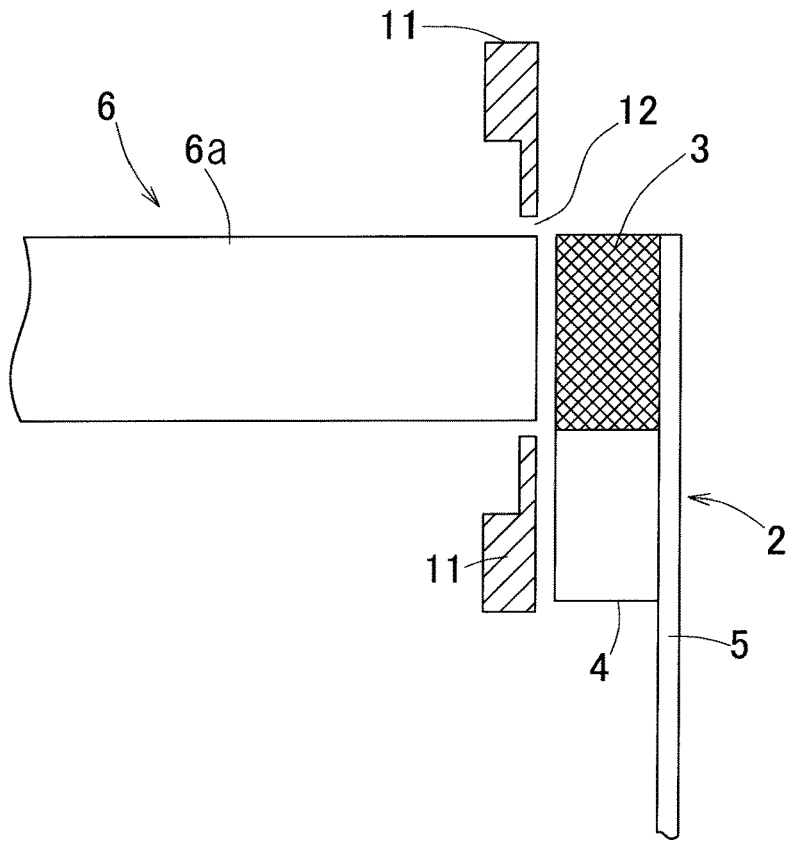
FIG. 9 shows a cut-away side view of a detail of a different magnetizing device.

In the embodiment under discussion, the magnetic shields 11 and 11 are of knife edge geometries—namely, such geometries that thicknesses thereof decrease in a continuous fashion towards the magnetization head 6a. Alternatively, as shown in FIG. 9, the geometries may be such that the thicknesses decrease in a stepwise fashion towards the magnetization head 6a. In this case, too, the aforementioned effect and advantage can be obtained.

Furthermore, by designing the dimension of each of the gaps δ1 and δ2 present between the magnetic shields 11 and 11 and the magnetization head 6a to be equal to or greater than 0.5 mm and equal to or smaller than 2 mm, optimal outcomes can be obtained in terms of magnetization strength and magnetization precision. That is to say, if the gaps δ1 and δ2 are equal to 0.5 mm, magnetic resistance in the gaps δ1 and δ2 decreases, thereby increasing the flowability of magnetic flux from the magnetization head 6a into the magnetic shields 11 and 11. In such a case, less magnetic flux is introduced into a magnetic encoder track 3 (4), thus possibly decreasing magnetization strength. On the other hand, if the gaps δ1 and δ2 are equal to or more than 2 mm, less shielding effect is available, thus making it difficult to perform magnetization with precision. These are the reasons for designing the dimensions of the gaps δ1 and δ2 to be in the aforementioned range of values.

Other embodiments of the present invention will now be described. In the description that follows, various embodiments may include features corresponding to those features that have already been described in the preceding embodiments. Such features are indicated with the same reference signs, and the previous discussions of these features may not be repeated. Where the embodiments are partially shown and described, the remainder of the embodiments should be understood as the same as what has been described in the preceding embodiments. Aside from those combinations of features that are particularly discussed in individual embodiments, other combinations of features from different embodiments are also possible unless such combinations render the device inoperable.

Figure 13:
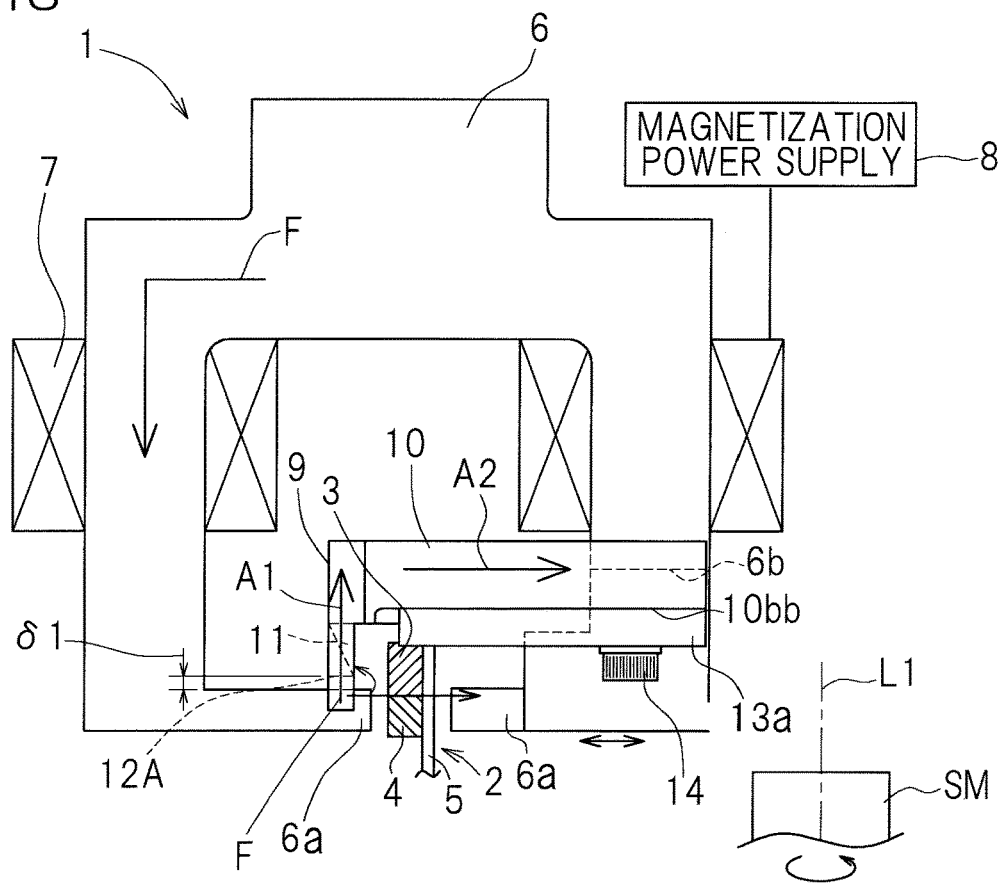
FIG. 13 shows a schematic configuration of a magnetizing device for a magnetic encoder, in accordance with another embodiment of the present invention.
Figure 14:
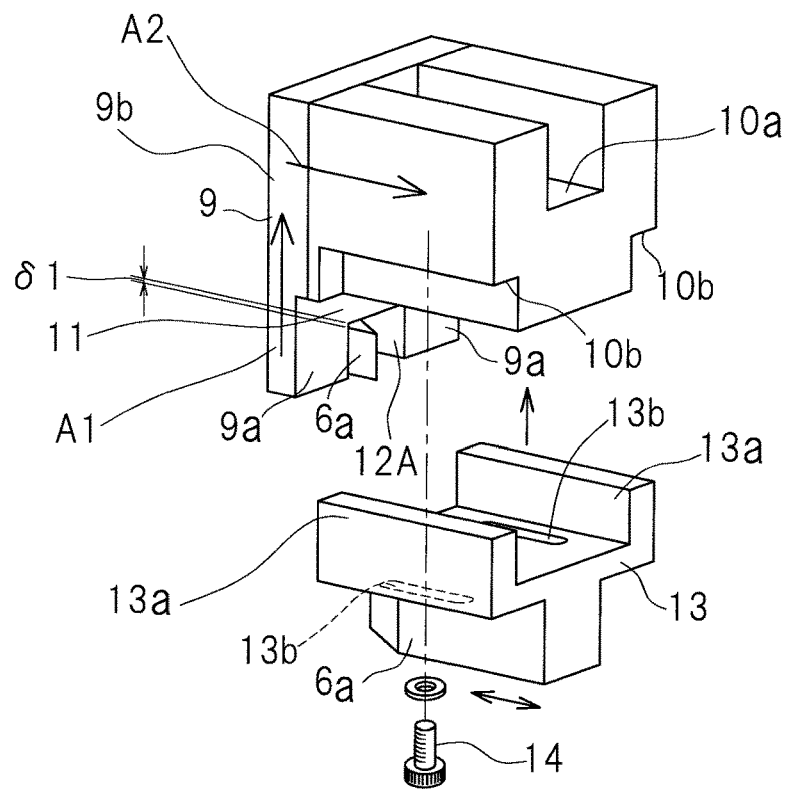
FIG. 14 shows an exploded perspective view of a magnetic shield forming member and of a magnetic path generating member of the magnetizing device.

In the embodiment of FIG. 13 and FIG. 14, a magnetic shield 11 is disposed on only one of opposite sides, along a direction in which the plurality of the magnetic encoder tracks 3 and 4 are arranged, of a left magnetization head 6a. Accordingly, in such a configuration, instead of being inserted through the through opening 12 (FIG. 6, FIG. 7A and FIG. 7B), a left magnetization head 6a is inserted through a groove 12A that is defined by a single magnetic shield 11 and the first magnetic path generating portions 9a and 9a. A gap δ1 formed between the magnetic shield 11 and the left magnetization head 6a may be designed as a predetermined gap of equal to or greater than 5 mm and equal to or smaller than 2 mm and may be designed to be constant. The rest of the configuration is the same as that of the embodiment of FIG. 3A and FIG. 3B to FIG. 8.

In this particular embodiment, one magnetic encoder track 4, which is a target track, is positioned between the magnetization heads 6a and 6a, while a non-target magnetic encoder track 3 is positioned in an upper location relative to the magnetic encoder track 4 along a direction in which these magnetic encoder tracks 3 and 4 are arranged, in order to block a flow of the magnetic flux that is going into the magnetic encoder track 3. By disposing a magnetic shield 11 on only one of opposite sides, along a direction in which the magnetic encoder tracks are arranged, of the magnetization head 6a, the construction of the magnetic shield forming member 9 can be simplified, thus lowering the manufacturing cost of the magnetizing device 1.

Figure 15:
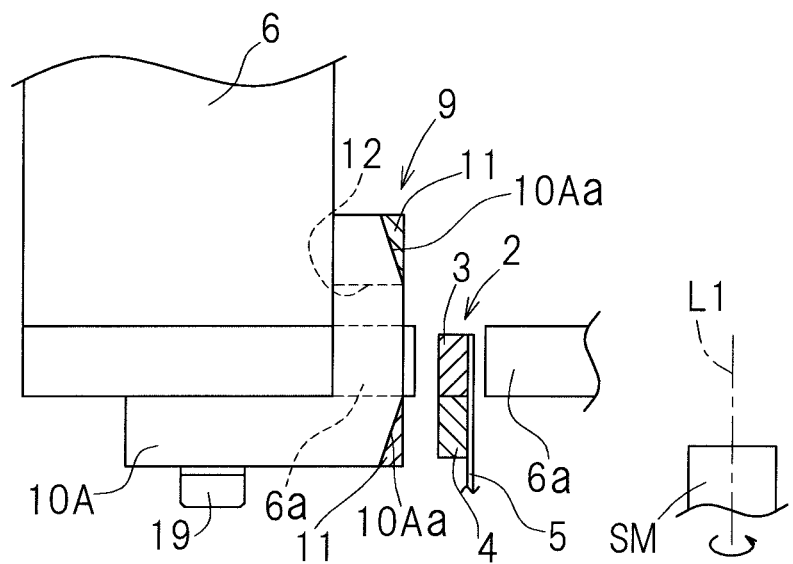
FIG. 15 shows a schematic configuration of a magnetizing device for a magnetic encoder, in accordance with another embodiment of the present invention.
Figure 16:
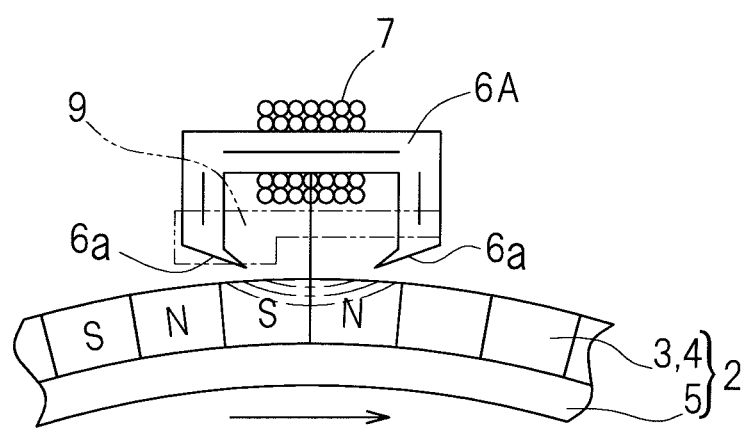
FIG. 16 shows a schematic configuration of a magnetizing device for a magnetic encoder, in accordance with yet another embodiment of the present invention.
Figure 17:
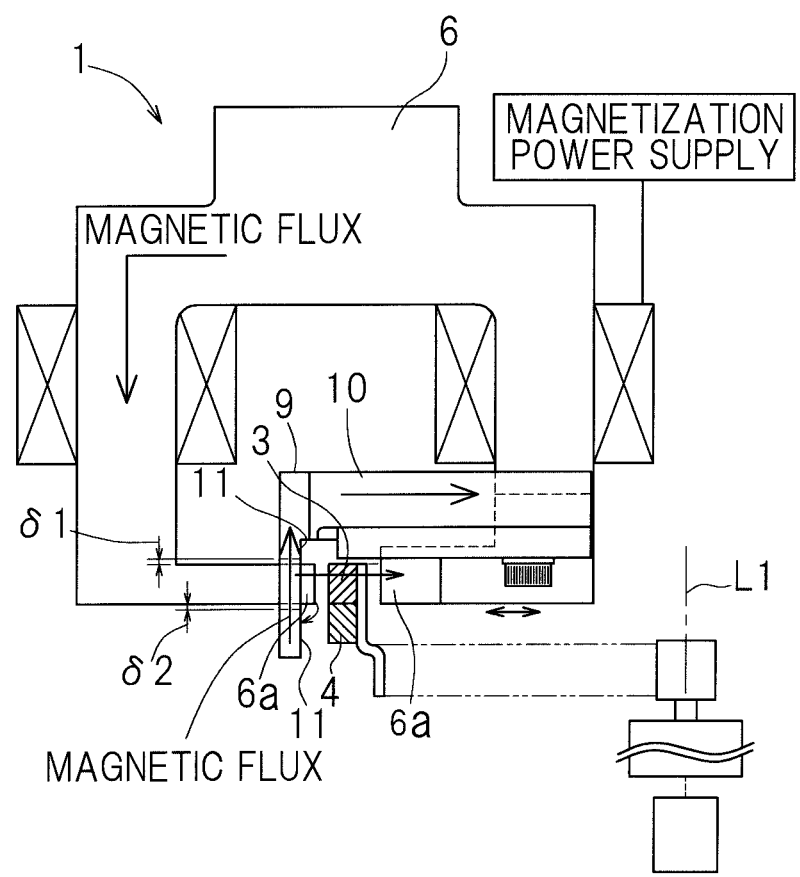
FIG. 17 shows a schematic configuration of a conventional magnetizing device.

In the embodiment that is shown in FIG. 15, the magnetic shield forming member 9, for example, may include a non-magnetic member 10A that is made of non-magnetic material such as aluminum or copper, and magnetic shields 11 and 11 that are affixed to respective upper and lower inclined surfaces 10Aa and 10Aa of the non-magnetic member 10A. Analogous to the preceding embodiments, these magnetic shields 11 and 11 may also be of knife edge geometries—that is, such geometries that thicknesses thereof decrease in a continuous fashion as the magnetic shields 11 and 11 progress more in a radially inner direction, with the radially inner direction extending along a direction in which the plurality of the magnetic encoder tracks 3 and 4 are arranged. Alternatively, the magnetic shields 11 and 11 may be of such geometries that the thicknesses thereof decrease in a stepwise direction as they progress more in such a radially inner direction. The non-magnetic member 10A can be removably coupled to a left magnetization head 6a by means of a bolt 19. These magnetic shields 11 and 11 can be disposed at a left magnetization head 6a, in such a way that they are arranged in a neighboring fashion along a direction in which the plurality of the magnetic encoder tracks 3 and 4 are arranged. According to the embodiment under discussion in which the magnetic shields 11 and 11 are provided via the non-magnetic member 10A on the magnetization head 6a of the magnetization yoke 6, the management of magnetic gaps can be simplified while also allowing the assembly of the magnetic shields 11 to be more easily performed.

Although in the preceding embodiments a magnetizing device 1 that includes a so-called penetration-type magnetization yoke 6 has been shown and described, any one of the aforementioned constructions of the magnetic shield forming member 9 can also be applied to a magnetizing device that includes a surface interaction-type magnetization yoke 6A. In any one of the preceding embodiments, the magnetization yoke may include a plurality of pairs of the magnetization heads, with respective pairs of the magnetization heads being offset from each other so as to correspond to the arrangement of the plurality of the magnetic encoder tracks. For example, in the case of an axial type magnetic encoder, the respective pairs of the magnetization heads may be radially offset from each other. In the case of a radial type magnetic encoder, the respective pairs of the magnetization heads may be axially offset from each other. Here, a magnetic sensor configured to detect magnetization strength of each magnetized magnetic pole may be arranged in an available space. By using such a magnetic sensor to detect the magnetization strength, the magnetic encoder can be checked for quality.

The magnetizing device 1 may be designed to simultaneously magnetize a plurality of unmagnetized magnetic encoder tracks. In such a case, more than one magnetic encoder track can be produced in a single magnetization period, thereby shortening the time required to complete magnetization as compared with track-by-track magnetization. The plurality of the magnetic encoder tracks may be arranged in a direction extending at an angle to an axis of rotation of the magnetic encoder. By incorporating into a wheel support bearing assembly such a plurality of magnetic encoder tracks that are arranged in an angled fashion, the axial extension of the entire wheel support bearing assembly may be reduced, thereby enabling the assembly to be more compact.

Although exemplary embodiments have been used to show and describe how the present invention may be carried out, those embodiments described herein only represent merely illustrative, non-limiting examples. The scope of the present invention is not defined by the foregoing description but by the appended claims and is intended to encompass, in addition to what is defined by the appended claims, all of modifications within the meaning and extent of equivalents thereof.

REFERENCE NUMERALS

1 . . . Magnetizing device
2 . . . Annular magnetic body
3, 4 . . . Magnetic encoder track
6 . . . Magnetization yoke
6a . . . Magnetization head
7 . . . Excitation coil
8 . . . Magnetization power supply
9 . . . Magnetic shield forming member
11 . . . Magnetic shield
ME . . . Magnetic encoder

What is claimed is:

1. A magnetizing device for a magnetic encoder operable to magnetize an annular magnetic body that integrally has a plurality of unmagnetized annular magnetic encoder tracks arranged so as to adjoin each other, by causing the annular magnetic body to rotate to magnetize circumferential portions of the annular magnetic body one at a time, thereby producing a magnetic encoder with the magnetic encoder tracks, which have respective magnetic patterns formed thereon that are different from each other, the magnetizing device comprising:
  a magnetization yoke including a pair of magnetization heads magnetically confronting each other through a magnetic gap, the magnetization yoke being configured to magnetize a magnetic encoder track of the magnetic encoder, the magnetic encoder track being arranged in a defined location and position relative to the magnetization heads;
  an excitation coil wound around the magnetization yoke;
  a magnetization power supply configured to supply a magnetizing current to the excitation coil to generate magnetic flux between the pair of magnetization heads; and
  a magnetic shield provided on the magnetization yoke, the magnetic shield being spaced apart from one of the magnetization heads with a gap being formed therebetween along a direction in which the plurality of the magnetic encoder tracks are arranged, and being configured to block a flow of magnetic flux that is present outside a defined extension of a flow of the magnetic flux between the magnetization heads, the magnetic shield being of such a geometry that a thickness thereof progressively decreases towards the one of the magnetization heads.

2. The magnetizing device for a magnetic encoder as claimed in claim 1, wherein the magnetic shield is of such a geometry that a thickness thereof progressively decreases in a continuous fashion towards the one of the magnetization heads.

3. The magnetizing device for a magnetic encoder as claimed in claim 2, wherein two magnetic shields are disposed on opposite sides of the one of the magnetization heads along a direction in which the magnetic encoder tracks are arranged such that the one of the magnetization heads is interposed between the two magnetic shields.

4. The magnetizing device for a magnetic encoder as claimed in claim 2, wherein the gap between the magnetic shield and the one of the magnetization heads is equal to or greater than 0.5 mm and equal to or smaller than 2 mm.

5. The magnetizing device for a magnetic encoder as claimed in claim 1, wherein the magnetic shield is of such a geometry that a thickness thereof progressively decreases in a stepwise fashion towards the one of the magnetization heads.

6. The magnetizing device for a magnetic encoder as claimed in claim 5, wherein two magnetic shields are disposed on opposite sides of the one of the magnetization heads along a direction in which the magnetic encoder tracks are arranged such that the one of the magnetization heads is interposed between the two magnetic shields.

7. The magnetizing device for a magnetic encoder as claimed in claim 5, wherein the gap between the magnetic shield and the one of the magnetization heads is equal to or greater than 0.5 mm and equal to or smaller than 2 mm.

8. The magnetizing device for a magnetic encoder as claimed in claim 1, wherein two magnetic shields are disposed on opposite sides of the one of the magnetization heads along a direction in which the magnetic encoder tracks are arranged such that the one of the magnetization heads is interposed between the two magnetic shields.

9. The magnetizing device for a magnetic encoder as claimed in claim 8, wherein the gap between the magnetic shield and the one of the magnetization heads is equal to or greater than 0.5 mm and equal to or smaller than 2 mm.

10. The magnetizing device for a magnetic encoder as claimed in claim 1, wherein the gap between the magnetic shield and the one of the magnetization heads is equal to or greater than 0.5 mm and equal to or smaller than 2 mm.

\* \* \* \* \*